UNITED STATES PATENT OFFICE.

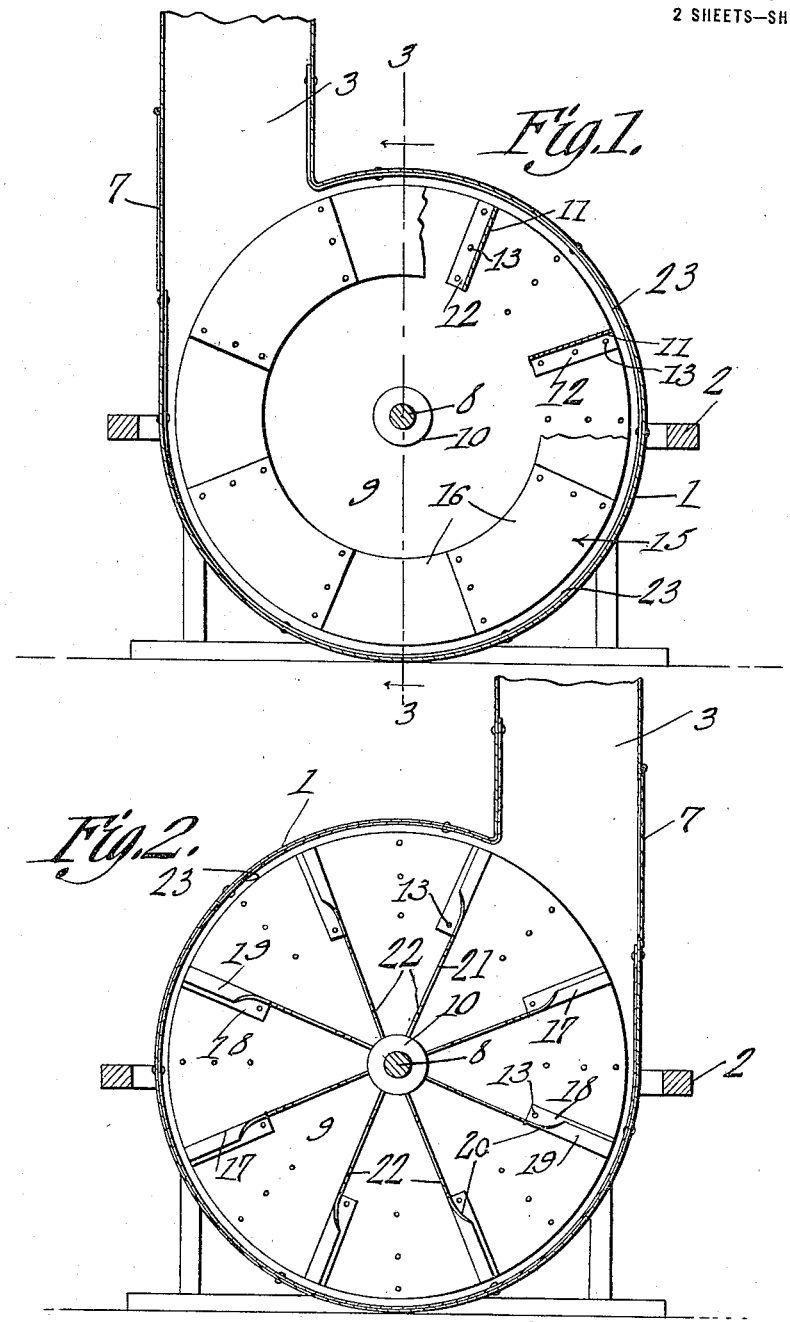

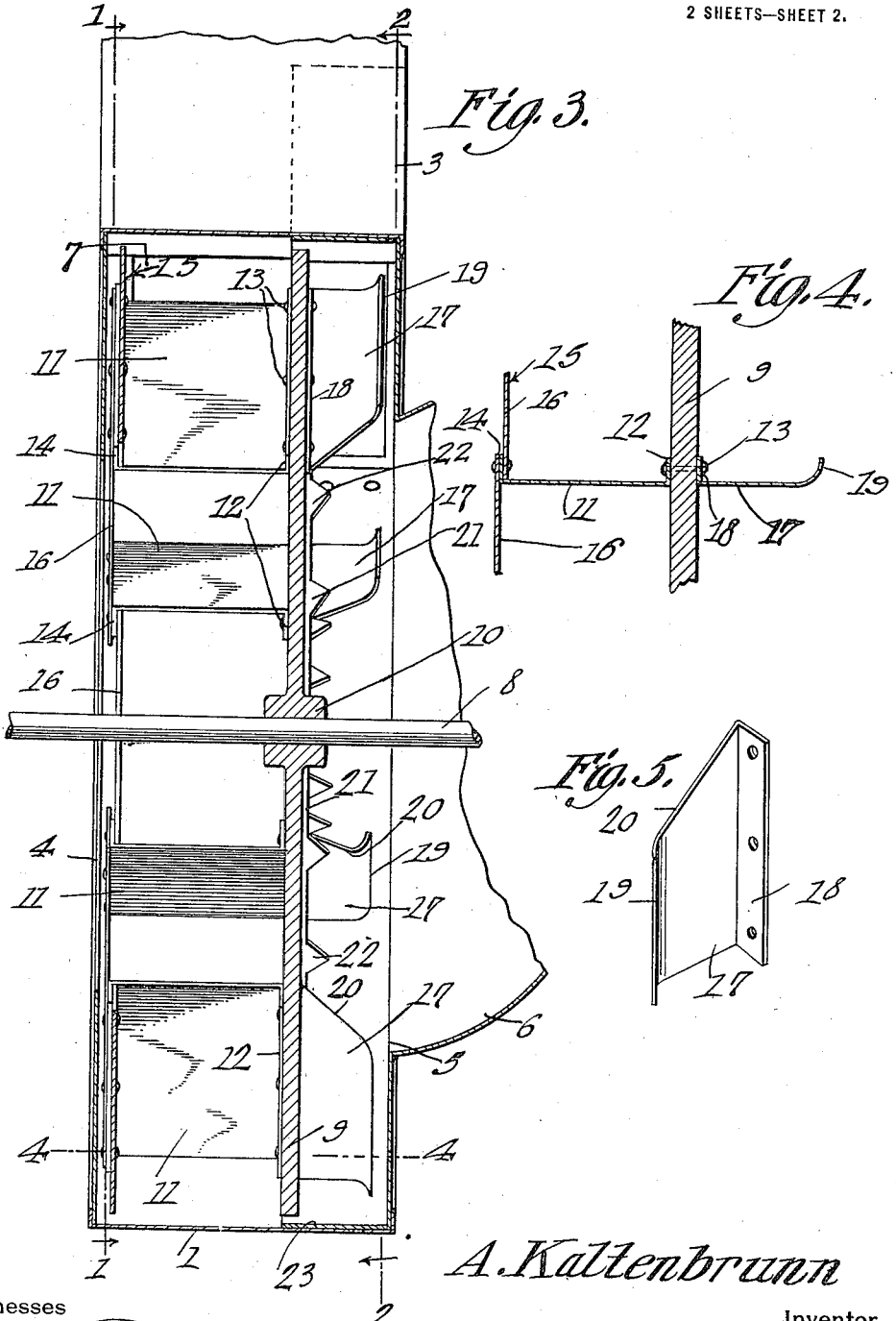

ANTON KALTENBRUNN, OF ST. NAZIANZ, WISCONSIN.

BLOWER.

1,181,459.      Specification of Letters Patent.      Patented May 2, 1916.

Application filed January 8, 1915. Serial No. 1,166.

*To all whom it may concern:*

Be it known that I, ANTON KALTENBRUNN, a citizen of the United States, residing at St. Nazianz, in the county of Manitowoc and State of Wisconsin, have invented a new and useful Blower, of which the following is a specification.

The present invention appertains to blowers, and relates more particularly to a pneumatic elevator.

It is the object of this invention to provide a novel and improved blower adapted for elevating ensilage, feed, hay, straw, or other materials.

As a more specific object, the invention aims to provide a blower of novel construction, having independent air and shovel blades, whereby the air blades will create a blast or current of air, while the shovel blades deliver the material so that it will be effectively taken up by the current of air, there being no interference between the centrifugal action of the air and material within the blower, so that the efficiency of the blower is enhanced.

It is also within the scope of the invention, to provide an elevating blower improved generally in its construction, and embodying a unique assemblage of the component parts, whereby the utility of the appliance is advanced.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawings, wherein:—

Figure 1 is a vertical section of the blower on a reduced scale, taken on the line 1—1 of Fig. 3, parts being broken away. Fig. 2 is a vertical section of the device, on a reduced scale, taken on the line 2—2 of Fig. 3. Fig. 3 is a vertical section on an enlarged scale, taken on the line 3—3 of Fig. 1, portions being broken away. Fig. 4 is an enlarged sectional detail taken on the line 4—4 of Fig. 3. Fig. 5 is a perspective view of one of the shovel blades or cups of the rotor.

In carrying out the invention, the blower embodies a circular casing 1, preferably having its axis horizontal, and supported or carried by a suitable frame 2. The casing 1 is provided with a peripheral outlet flue or pipe 3 projecting upwardly therefrom and arranged tangentially relative thereto, so that the centrifugal action of the air and material within the casing will result in their being discharged with considerable impetus into the outlet pipe 3. The casing 1 is provided at one side with a central or axial air inlet opening 4, and at its other side with a central or axial inlet opening 5 for the silage, cut feed or other material. The opening 4 is preferably slightly smaller in diameter than the opening 5, and the side of the casing having the opening 5 is preferably provided with a suitable chute 6 for delivering the material through the opening 5 into the casing. One side of the outlet pipe 3 is also preferably provided with a door 7, which can be opened to enable access to be had to the parts within the casing, for the purpose of repairs, examination or cleaning.

A horizontal shaft 8 is journaled in any suitable manner upon the frame 2, and projects axially through the casing 1, and carries the rotor within the casing. This rotor embodies a circular plate or disk 9 having a central hub 10 secured in any suitable manner upon the shaft 8, and the disk 9 carries fan blades at that side adjacent the opening 4, and shovel or delivering blades at that side adjacent the opening 5. The disk 9 is of a diameter just slightly smaller than the internal diameter of the casing 1, whereby the disk will serve as a dividing partition between the fan and shovel blades. The disk 9 is also preferably disposed closer to that side of the casing having the opening 5, than the other side, to provide a relatively narrow chamber or space between the disk 9 and that side of the casing having an opening 5, and a relatively wide air chamber or space between the disk and that side of the casing having the opening 4.

The fan blades 11, which are of rectangular outline, are preferably, although not necessarily, constructed of sheet metal, and are disposed radially at that side of the disk 9 adjacent the opening 4, and are arranged adjacent the marginal periphery of the disk. Those edges of the blades 11 adjacent the disk are provided with flanges 12 secured by means of rivets, bolts or other securing elements 13 to the disk 9, and the other edges of the blades 11, which are remote from the disk 9, are also provided with angularly projecting flanges 14. A ring 15 is secured to those edges of the blades 11 remote from the disk 9, the ring 15 embodying sheet metal sections 16 which overlap the flanges 14 of the blades 11, to be secured thereto in any suitable manner. The opening 4 is preferably of the same or slightly smaller diameter than the internal diameter of the ring 15, it being noted that radial air pockets are provided between the blades 11, the disk 9 and the ring 15, so that the inner ends of the said pockets communicate with the space adjacent the shaft 8 and opening 4. The ring 15 confines the air within the said radial pockets, so that the air is prevented from passing around those edges of the blades 11 remote from the disk 9 and in this manner, the efficiency of the fan is increased.

The shovel or delivering blades 17, which are preferably constructed of sheet metal, and which are narrower than the blades 11, are provided with basal flanges 18 bearing against that side of the disk 9 opposite the blades 11 and the flanges 18 are preferably engaged to the securing elements 13 which secure the blades 11 to the disk. As illustrated in Figs. 1 and 2, the disk 9 is provided with additional apertures between the blades 11 for additional shovel blades 17, if it is desired to increase the capacity of the blower. The free edges of the shovel blades 17 which are disposed adjacent that side of the casing 5, having the opening, are curved or bent, as at 19, so that the shovel blades will form cups or buckets for properly catching and holding the material, and the inner ends of the radial blades 17 are preferably cut diagonally or obliquely, as at 20, to facilitate the entrance of the material between the shovel blades 17 to be taken up thereby. Thus, the distance between the free end portions of the opposite blades 17 is greater than the distance between the basal edge portions of the said blades, as clearly seen by reference to Fig. 3.

The opening 5 is preferably slightly smaller in diameter than the distance between the free edge portions of the opposite blades 17, and is of larger diameter than the distance between the basal edge portions of the opposite blades 17, to facilitate the entrance of the material between or in advance of the shovel blades. That side of the disk 9 adjacent the material inlet opening 5 is preferably provided with radial ribs 21 extending from the hub 10 to the blades 17, and the ribs 21 are provided with outstanding ears 22 which are arranged to engage the material for throwing the same outwardly or radially between the shovel blades 17.

In operation, the shaft 8 is rotated at a sufficiently high, but not excessive velocity, for properly rotating the rotor, and the silage, cut feed or other material to be elevated is delivered through the opening 5 in any suitable manner. The rotation of the rotor will result in the fan or air blades 11 creating a centrifugal action of the air within the casing, so that the air will be drawn in through the opening 4 and discharged in a strong blast or current through the discharge or outlet pipe 3, whereas the shovel blades 17 will take up the material to forcibly direct the same by centrifugal action into the outlet pipe 3. The material being discharged into the outlet pipe 3, will be taken up by the strong current of air and will be elevated or conveyed through the discharge or eduction pipe to the outlet or discharge end thereof.

With the present blower, the air and material are kept separated within the casing 1, by the disk 9 which carries the fan and shovel blades, and as a result there is no interference between the centrifugal actions of the air and material. Consequently, the material will not impair the action of the air, and in this manner, the efficiency of the blower is increased, which will enable the blower to be run at a lower speed, for saving power as well as wear and tear. The fan and shovel blades are independent, and are each arranged to properly perform their intended function. The sectional ring 15 not only directs the air radially between the fan blades 11, but also renders the fan blades rigid, to overcome the impinging action of the air thereagainst which tends to bend or flex the blades 11 back against the disk 9. The present blower also permits of the elevation of heavier materials, than is possible with ordinary blowers, and the material will be delivered or discharged in a steady or uniform manner, and without an intermittent or pulsating action of the air or material which has been found to be frequently a source of trouble in ordinary blowers. With a steady air current and discharge of the material, the material is properly conveyed with the air through the outlet pipe, with the material carried in suspension by the air, without the tendency of the material dropping during its passage through the outlet pipe. The number of blades may be increased or decreased, according to the diameter and capacity of the blower.

A removable wear strip 23 is secured to the inner surface of the peripheral portion of the casing adjacent that side of the casing having the material inlet 5, and surrounds the shovel blades. The strip 23 has its ends extending into the outlet pipe 3, and is designed to have the material contact therewith when it is revolved and forced radially, so as to eliminate the wear of the casing. The strip 23 is removable.

Having thus described the invention, what is claimed is:—

A blower comprising a circular casing having a central material inlet at one side and a peripheral outlet extending tangentially therefrom, and a rotor mounted within the casing embodying a disk and shovel blades carried by one side of the disk adjacent the margin thereof and spaced considerably from the hub of the disk, said side of the disk having ribs extending radially from the hub to the blades, and said ribs being provided with outstanding ears engageable with the material entering the casing from the inlet.

In testimony that I claim the foregoing as my own, I have hereto affixed my signature in the presence of two witnesses.

ANTON KALTENBRUNN.

Witnesses:
ROSE WANISH,
FRED WILSMANN.

Copies of this patent may be obtained for five cents each, by addressing the "Commissioner of Patents, Washington, D. C."